United States Patent
Yang et al.

(10) Patent No.: US 9,688,158 B2
(45) Date of Patent: Jun. 27, 2017

(54) POWER DRIVING SYSTEM

(71) Applicant: Aleees Eco Ark Co. Ltd., Bade (TW)

(72) Inventors: An-Tao Anthony Yang, Bade (TW); Gordon Ching Chen, Bade (TW)

(73) Assignee: ALEEES ECO ARK (CAYMAN) CO., LTD., Grand Cayman (KY)

( * ) Notice: Subject to any disclaimer, the term of this patent is extended or adjusted under 35 U.S.C. 154(b) by 68 days.

(21) Appl. No.: 14/888,374

(22) PCT Filed: Apr. 30, 2014

(86) PCT No.: PCT/CN2014/076656
§ 371 (c)(1),
(2) Date: Oct. 30, 2015

(87) PCT Pub. No.: WO2014/177061
PCT Pub. Date: Nov. 6, 2014

(65) Prior Publication Data
US 2016/0082858 A1  Mar. 24, 2016

Related U.S. Application Data

(60) Provisional application No. 61/817,611, filed on Apr. 30, 2013.

(51) Int. Cl.
*H02P 1/00* (2006.01)
*B60L 11/18* (2006.01)
(Continued)

(52) U.S. Cl.
CPC ....... *B60L 11/1866* (2013.01); *B60L 11/1803* (2013.01); *B60L 11/1853* (2013.01);
(Continued)

(58) Field of Classification Search
CPC . Y02T 10/7005; Y02T 10/7077; Y02T 10/70; B60W 10/08; B60W 20/00
(Continued)

(56) References Cited

U.S. PATENT DOCUMENTS

| | | | |
|---|---|---|---|
| 2002/0070557 A1 | 6/2002 | Geis | |
| 2009/0183934 A1* | 7/2009 | Oyobe | B60K 6/26 180/65.265 |

(Continued)

FOREIGN PATENT DOCUMENTS

| | | |
|---|---|---|
| CN | 101512869 A | 8/2009 |
| CN | 102294963 A | 12/2011 |

(Continued)

*Primary Examiner* — Kawing Chan
*Assistant Examiner* — Bradley Brown
(74) *Attorney, Agent, or Firm* — Kirton McConkie; Evan R. Witt

(57) ABSTRACT

A power driving system for an electric vehicle with a motor includes plural battery boxes, a first DC bus, a second DC bus and a power converter. The first DC bus is electrically connected with the battery boxes for selectively receiving electric energy from the battery boxes. The second DC bus is electrically connected with the battery boxes for selectively receiving electric energy from the battery boxes. The power converter is connected between first DC bus and the second DC bus. After the power driving system is changed from a steady state power mode to a driving voltage switching mode, a driving voltage switching process is performed. By the power converter, a voltage of one of the first DC bus and the second DC bus in a steady state is used to adjust a voltage of the other of the first DC bus and the second DC bus.

15 Claims, 6 Drawing Sheets

(51) Int. Cl.
*H02J 1/10* (2006.01)
*H02J 7/34* (2006.01)
*B60L 15/04* (2006.01)
*B60L 15/08* (2006.01)
*B60W 10/08* (2006.01)

(52) U.S. Cl.
CPC ........... *B60L 11/1864* (2013.01); *B60L 15/04* (2013.01); *B60L 15/08* (2013.01); *H02J 1/10* (2013.01); *H02J 7/34* (2013.01); *B60L 2240/547* (2013.01); *B60L 2260/26* (2013.01); *B60W 10/08* (2013.01); *Y02T 10/7005* (2013.01); *Y02T 10/7061* (2013.01); *Y02T 10/7077* (2013.01); *Y02T 10/7258* (2013.01); *Y02T 10/92* (2013.01)

(58) Field of Classification Search
USPC ......................................................... 318/139
See application file for complete search history.

(56) References Cited

U.S. PATENT DOCUMENTS

2010/0133913 A1* 6/2010 Iida ..................... B60L 11/1868
307/82

2012/0098543 A1* 4/2012 Rutkowski .......... H01M 2/1077
324/435
2012/0125158 A1* 5/2012 Rezkallah ............. C22B 3/0067
75/398
2013/0002016 A1* 1/2013 Furukawa .......... H01M 10/425
307/9.1

FOREIGN PATENT DOCUMENTS

| | | |
|---|---|---|
| CN | 102653240 A | 9/2012 |
| CN | 102848931 A | 1/2013 |
| EP | 2993073 A1 | 3/2016 |
| JP | H07163015 A | 6/1990 |
| JP | H0370484 A | 3/1991 |
| JP | 2004364350 A | 12/2004 |
| JP | 2008017661 A | 1/2008 |
| JP | 2008060047 A | 3/2008 |
| JP | 2009033830 A | 2/2009 |
| JP | 2009106062 A | 5/2009 |
| JP | 2010172102 A | 8/2010 |
| WO | 2009108565 A2 | 9/2009 |
| WO | 2009108565 A3 | 9/2009 |
| WO | 2012053426 A1 | 4/2012 |
| WO | 2012125158 A1 | 9/2012 |
| WO | 2014177061 A1 | 11/2014 |

\* cited by examiner

POWER DRIVING SYSTEM

FIELD OF THE INVENTION

The present invention relates to a power driving system, and more particularly to a power driving system for using a vehicular computer to control plural DC bus to increase or decrease voltages in steps and optimizing the series connection configurations of battery modules of plural configuration-variable series-type battery boxes to provide electric energy to a motor in order to actively balance the stored energy of the battery modules in real time.

BACKGROUND OF THE INVENTION

Recently, the world's energy source is gradually depleted. Moreover, with the increasing environmental consciousness and the popularity of environmental protection, the demand on renewable energy is growing. Consequently, the conventional gasoline vehicles are gradually replaced by electric vehicles, and the electric vehicle has become popular transport means in recent years.

Nowadays, an electric vehicle such as a large electric vehicle is equipped with a power driving system and a motor. The power driving system is used for driving operations of the motor in order to drive the electric vehicle. Conventionally, the power driving system receives a constant DC bus voltage from a battery box, and a power transistor of the power driving system is operated in a pulse width modulation mode to generate a sine wave to drive the motor. The power transistor operated in the pulse width modulation mode can largely reduce the power loss and heat generation. However, if the rotating speed of the motor is very low, the duty cycle of the power transistor has to be reduced to a very low value. Under this circumstance, the sine wave outputted from the motor drive is suffered from distortion. The distorted sine wave will result in torque ripple. The torque ripple will adversely affect the motor power and the comfort of riding the electric vehicle.

Generally, as the DC bus voltage is reduced, the torque ripple resulted from the low motor speed can be overcome. However, the maximum motor speed is also decreased. A method of avoiding the generation of the torque ripple at the low motor speed uses a low voltage source, and a boost circuit is connected between the voltage source and the DC bus. In case that the motor speed is low, the voltage source directly provides electric energy to the DC bus. Whereas, in case that the motor speed reaches a specified speed, the boost circuit is enabled to increase the DC bus voltage. However, as the motor power is gradually increased, the cost of the boost circuit is increased and thus the fabricating cost of the power driving system is high. Moreover, since the power transistor of the boost circuit may generate a slight voltage drop, the efficiency is impaired.

Another method for reducing the torque ripple uses a voltage-switchable voltage source. Generally, the electric vehicle such as the large electric vehicle is usually equipped with plural batteries. In addition, the plural batteries are serially connected with each other through relays in order to achieve the voltage-switchable function. However, while the relays are switched, the generated electric arc may damage the contacts of the relays. Moreover, while the relays are switched, the generated surge current may adversely affect the use lives of the batteries.

Therefore, there is a need of providing an improved power driving system in order to overcome the above drawbacks.

SUMMARY OF THE INVENTION

An object of the present invention provides a power driving system. By a power converter, the voltage of a first DC bus or a second DC bus in a standby state is adjusted to the voltage corresponding to a target number of serially-connected battery modules. Moreover, a driving voltage switching process is performed to switch the voltage of the power supply loop of each configuration-variable series-type battery box. Moreover, a first drive power transistor module and a second drive power transistor module can synchronously provide electric energy at different stages and optimized transistor duty cycles so as to generate the stable output power. Moreover, by adjusting the target number of serially-connected battery modules of the configuration-variable series-type battery box, the output voltage of the configuration-variable series-type battery box is adjusted. Consequently, the problems of the conventional power driving system (e.g., the generation of the torque ripple, the high fabricating cost and the generation of surge current during the voltage driving process) will be overcome.

In accordance with an aspect of the present invention, there is provided a power driving system for an electric vehicle. The electric vehicle includes a motor. The power driving system includes plural configuration-variable series-type battery boxes, a first DC bus, a second DC bus and a power converter. The first DC bus is electrically connected with the plural configuration-variable series-type battery boxes for selectively receiving electric energy from the plural configuration-variable series-type battery boxes. The second DC bus is electrically connected with the plural configuration-variable series-type battery boxes for selectively receiving electric energy from the plural configuration-variable series-type battery boxes. The power converter is electrically connected between first DC bus and the second DC bus. After the power driving system is changed from a steady state power mode to a driving voltage switching mode, a driving voltage switching process is performed. If the first DC bus is in a steady state and the second DC bus is in a standby state while the driving voltage switching process is performed, the power converter uses a voltage of the first DC bus to adjust a voltage of the second DC bus. Alternatively, if the second DC bus is in the steady state and the first DC bus is in the standby state while the driving voltage switching process is performed, the power converter uses the voltage of the second DC bus to adjust the voltage of the first DC bus.

In accordance with another aspect of the present invention, there is provided a power driving system. The power driving system includes a motor, a first DC bus, a first drive power transistor module, a second DC bus, a power converter, a first configuration-variable series-type battery box, a first power transistor of a first power transistor set, a second power transistor of the first power transistor set, a second configuration-variable series-type battery box, a first power transistor of a second power transistor set, a second power transistor of the second power transistor set, a third configuration-variable series-type battery box, a first power transistor of a third power transistor set, a second power transistor of the third power transistor set, and a controlling unit. The first drive power transistor module is electrically connected between the motor and the first DC bus so as to selectively drive the motor. The second drive power transistor module is electrically connected between the motor and the second DC bus so as to selectively drive the motor. The power converter is electrically connected between the first DC bus and the second DC bus for transmitting electric energy from the first DC bus to the second DC bus or transmitting electric energy from the second DC bus to the first DC bus. The first configuration-variable series-type battery box includes plural battery modules. If one or more battery modules of the plural battery modules are connected to a first bypass loop, an output voltage from the first configuration-variable series-type battery box is decreased. The first power transistor of the first power transistor set electrically is connected between the first configuration-variable series-type battery box and the first DC bus. The second power transistor of the first power transistor set is electrically connected between the first configuration-variable series-type battery box and the second DC bus. The second configuration-variable series-type battery box includes plural battery modules. If one or more battery modules of the plural battery modules are connected to a second bypass loop, an output voltage from the second configuration-variable series-type battery box is decreased. The first power transistor of the second power transistor set is electrically connected between the second configuration-variable series-type battery box and the first DC bus. The second power transistor of the second power transistor set is electrically connected between the second configuration-variable series-type battery box and the second DC bus. The third configuration-variable series-type battery box includes plural battery modules. If one or more battery modules of the plural battery modules are connected to a third bypass loop, an output voltage from the third configuration-variable series-type battery box is decreased. The first power transistor of the third power transistor set is electrically connected between the third configuration-variable series-type battery box and the first DC bus. The second power transistor of the third power transistor set is electrically connected between the third configuration-variable series-type battery box and the second DC bus. The controlling unit controls the power converter, the first configuration-variable series-type battery box, the first power transistor of the first power transistor set, the second power transistor of the first power transistor set, the second configuration-variable series-type battery box, the first power transistor of the second power transistor set, the second power transistor of the second power transistor set, the third configuration-variable series-type battery box, the first power transistor of the third power transistor set and the second power transistor of the third power transistor set.

In accordance with another aspect of the present invention, there is provided a power driving system. The power driving system includes a first motor, a second motor, a first DC bus, a first drive power transistor module, a second DC bus, a second drive power transistor module, a third DC bus, a second motor drive, a first power converter, a second power converter, a third power converter, a first configuration-variable series-type battery box, a first power transistor of a first power transistor set, a second power transistor of the first power transistor set, a second configuration-variable series-type battery box, a first power transistor of a second power transistor set, a second power transistor of the second power transistor set, a third configuration-variable series-type battery box, a first power transistor of a third power transistor set, a second power transistor of the third power transistor set, and a controlling unit. The first drive power transistor module is electrically connected between the first motor and the first DC bus so as to selectively drive the first motor. The second drive power transistor module is electrically connected between the first motor and the second DC bus, and the first drive power transistor module and the second drive power transistor module are collaboratively defined as a first motor drive so as to selectively drive the first motor. The second motor drive is electrically connected between the second motor and the third DC bus so as to drive the second motor. The first power converter is electrically connected between the first DC bus and the second DC bus for transmitting electric energy from the first DC bus to the second DC bus or transmitting electric energy from the second DC bus to the first DC bus. The second power converter is electrically connected between the first DC bus and the third DC bus for transmitting electric energy from the first DC bus to the third DC bus. The third power converter is electrically connected between the second DC bus and the third DC bus for transmitting electric energy from the second DC bus to the third DC bus. The first configuration-variable series-type battery box includes plural battery modules. If one or more battery modules of the plural battery modules are connected to a first bypass loop, an output voltage from the first configuration-variable series-type battery box is decreased. The first power transistor of the first power transistor set is electrically connected between the first configuration-variable series-type battery box and the first DC bus. The second power transistor of the first power transistor set is electrically connected between the first configuration-variable series-type battery box and the second DC bus. The second configuration-variable series-type battery box includes plural battery modules. If one or more battery modules of the plural battery modules are connected to a second bypass loop, an output voltage from the second configuration-variable series-type battery box is decreased. The first power transistor of the second power transistor set is electrically connected between the second configuration-variable series-type battery box and the first DC bus. The second power transistor of the second power transistor set is electrically connected between the second configuration-variable series-type battery box and the second DC bus. The third configuration-variable series-type battery box includes plural battery modules. If one or more battery modules of the plural battery modules are connected to a third bypass loop, an output voltage from the third configuration-variable series-type battery box is decreased. The first power transistor of a third power transistor set is electrically connected between the third configuration-variable series-type battery box and the first DC bus. The second power transistor of the third power transistor set is electrically connected between the third configuration-variable series-type battery box and the second DC bus. The controlling unit controls the operations of the first power converter, the second power converter, the third power converter, the first configuration-variable series-type battery box, the first power transistor of the first power transistor set, the second power transistor of the first power transistor set, the second configuration-variable series-type battery box, the first power transistor of the second power transistor set, the second power transistor of the second power transistor set, the third configuration-variable series-type battery box, the first power transistor of the third power transistor set and the second power transistor of the third power transistor set.

In accordance with another aspect of the present invention, there is provided a power driving system. The power driving system includes a motor, plural DC buses and a controlling unit. The plural DC buses provide electric energy to the motor, wherein one of the plural DC buses is higher than other DC buses. The controlling unit controls the power driving system to perform a driving voltage switching process. The driving voltage switching process includes a bus voltage adjusting process, a configuration-variable series-type battery box switching process and a current load distribution process.

The above contents of the present invention will become more readily apparent to those ordinarily skilled in the art after reviewing the following detailed description and accompanying drawings, in which:

DETAILED DESCRIPTION OF THE PREFERRED EMBODIMENT

Figure 1:
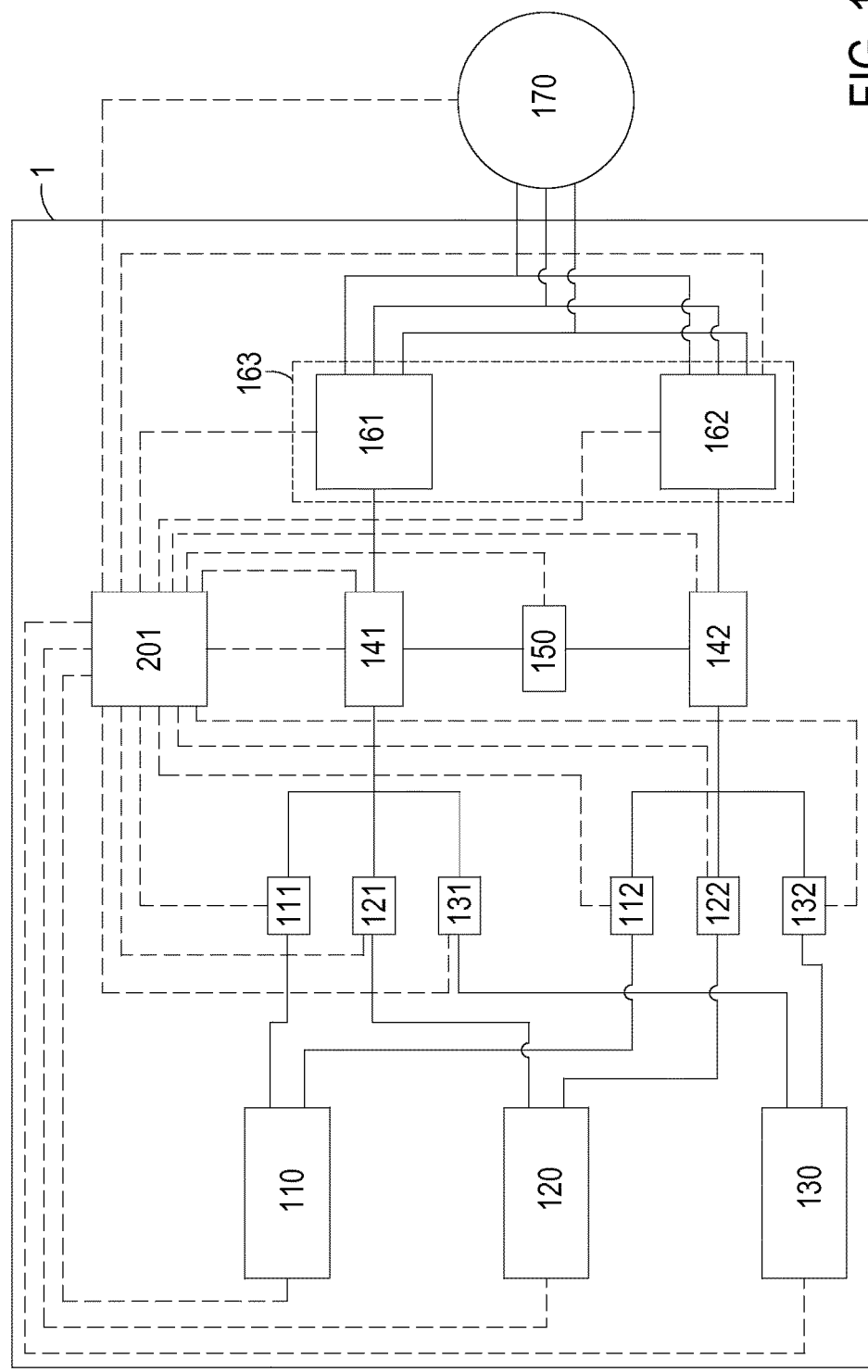
FIG. 1 schematically illustrates the architecture of a power driving system comprising plural configuration-variable series-type battery boxes according to a first embodiment of the present invention.
Figure 2:
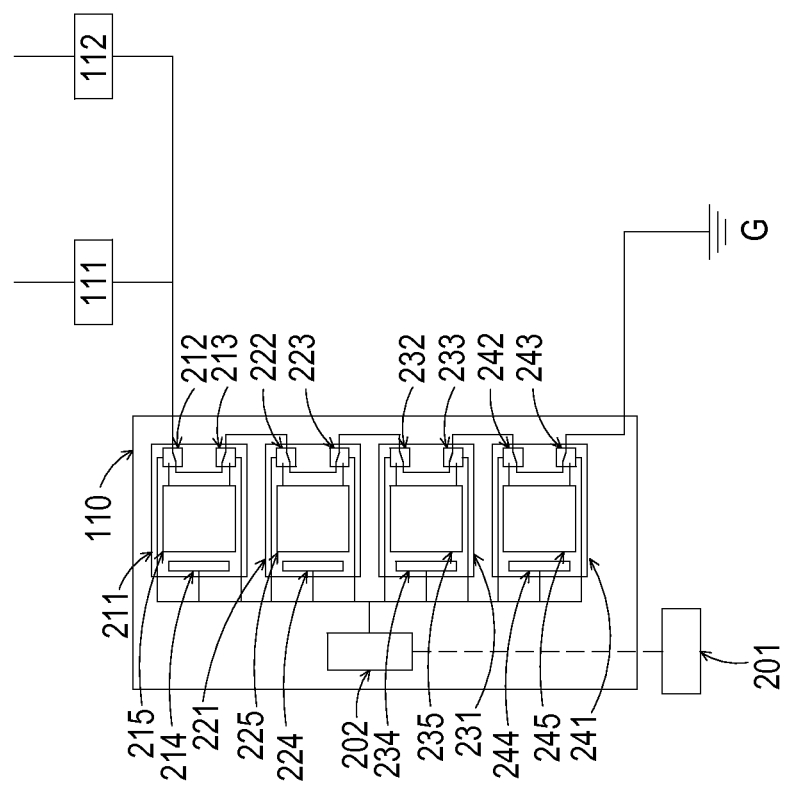
FIG. 2 schematically illustrates the architecture of the first configuration-variable series-type battery box of FIG. 1.

Please refer to FIGS. 1 and 2. FIG. 1 schematically illustrates the architecture of a power driving system comprising plural configuration-variable series-type battery boxes according to a first embodiment of the present invention. FIG. 2 schematically illustrates the internal circuitry architecture of the first configuration-variable series-type battery box of FIG. 1. As shown in FIGS. 1 and 2, the power driving system 1 of this embodiment is applied to an electric vehicle, especially the large electric vehicle (e.g., an electric bus or an electric truck). The power driving system 1 is used for driving the operations of a first motor 170 in order to drive the electric vehicle. In this embodiment, the power driving system 1 comprises plural configuration-variable series-type battery boxes, plural power transistors, a first DC bus 141, a second DC bus 142, a first drive power transistor module 161, a second drive power transistor module 162, a first power converter 150 and a controlling unit. An example of the controlling unit includes but is not limited to a vehicular computer 201 as shown in FIG. 1. Moreover, the vehicular computer 201 is in communication with the plural configuration-variable series-type battery boxes, the plural power transistors, the first DC bus 141, the second DC bus 142, the first drive power transistor module 161, the second drive power transistor module 162, the first power converter 150 and the first motor 170. The vehicular computer 201 is used for controlling the operations of the plural configuration-variable series-type battery boxes, the plural power transistors, the first DC bus 141, the second DC bus 142, the first drive power transistor module 161, the second drive power transistor module 162, and the first power converter 150, and acquiring the operating information and electric energy information about the plural configuration-variable series-type battery boxes, the plural power transistors, the first DC bus 141, the second DC bus 142, the first drive power transistor module 161, the second drive power transistor module 162, the first power converter 150 and the first motor 170.

As shown in FIG. 1, the plural configuration-variable series-type battery boxes comprises a first configuration-variable series-type battery box 110, a second configuration-variable series-type battery box 120 and a third configuration-variable series-type battery box 130. Since the first configuration-variable series-type battery box 110, the second configuration-variable series-type battery box 120 and the third configuration-variable series-type battery box 130 have the same internal circuitry architectures, only the internal circuitry architecture of the first configuration-variable series-type battery box 110 will be described as follows. In FIG. 2, the internal circuitry architecture of the first configuration-variable series-type battery box 110 will be illustrated, and the internal circuitry architectures of the second configuration-variable series-type battery box 120 and the third configuration-variable series-type battery box 130 are not redundantly described herein. The first configuration-variable series-type battery box 110 comprises plural battery modules. The series connection configuration of the plural battery modules can be recombined. For example, as shown in FIG. 2, the plural battery modules comprises a first battery module 211, a second battery module 221, a third battery module 231 and a fourth battery module 241. Moreover, according to a command from the vehicular computer 201, the relay module in each of the battery modules 211, 221, 231 and 241 can be selectively connected to a bypass loop. In case that the relay module of a specified battery module is connected to the bypass loop, the specified battery module is switched to a hibernation mode. In other words, each of the battery modules 211, 221, 231 and 241 can be selectively disconnected from the power supply loop of the first configuration-variable series-type battery box 110. The relay module of the first battery module 211 comprises a first positive relay 212 and a first negative relay 213. The relay module of the second battery module 221 comprises a second positive relay 222 and a second negative relay 223. The relay module of the third battery module 231 comprises a third positive relay 232 and a third negative relay 233. The relay module of the fourth battery module 241 comprises a fourth positive relay 242 and a fourth negative relay 243. The first positive relay 212, the first negative relay 213, the second positive relay 222, the second negative relay 223, the third positive relay 232, the third negative relay 233, the fourth positive relay 242 and the fourth negative relay 243 are selectively connected with each other in series. Moreover, the fourth negative relay 243 is electrically connected with a ground terminal G. Similar to the first configuration-variable series-type battery box 110, the second configuration-variable series-type battery box 120 and the third configuration-variable series-type battery box 130 as shown in FIG. 1 are connected to this power structure.

The first configuration-variable series-type battery box 110 further comprises a first battery box monitoring board 202. Moreover, the first battery module 211, the second battery module 221, the third battery module 231 and the fourth battery module 241 have respective battery management systems (BMS) 214, 224, 234 and 244. Each of the battery management systems 214, 224, 234 and 244 are used for measuring and outputting the associated information of the corresponding battery modules such as the state of charge and the battery core temperature information. Moreover, the measured result is transmitted to the first battery box monitoring board 202. After the first battery box monitoring board 202 reports the information to the vehicular computer 201, the vehicular computer 201 calculates the priorities of the first battery module 211, the second battery module 221, the third battery module 231 and the fourth battery module 241. The first battery box monitoring board 202 is in communication with the battery management systems 214, 224, 234 and 244 for collecting the information of all battery management systems of the first configuration-variable series-type battery box 110. That is, the first battery box monitoring board 202 is used for collecting the information of the battery modules received by the battery management systems 214, 224, 234 and 244. Moreover, according to a command from the vehicular computer 201, the first battery box monitoring board 202 manages and controls all relay modules of the first configuration-variable series-type battery box 110. These relay modules are the first positive relay 212, the first negative relay 213, the second positive relay 222, the second negative relay 223, the third positive relay 232, the third negative relay 233, the fourth positive relay 242 and the fourth negative relay 243 as shown in FIG. 2. Consequently, these relay modules are selectively conducted or shut off. Moreover, the first battery module 211 has a single battery core string 215, the second battery module 221 has a single battery core string 225, the third battery module 231 has a single battery core string 235, and the fourth battery module 241 has a single battery core string 245.

In this embodiment, the power driving system 1 uses the plural configuration-variable series-type battery boxes to perform the driving voltage switching process. Moreover, as shown in FIG. 1, the plural power transistors comprises a first power transistor 111 of a first power transistor set, a second power transistor 112 of the first power transistor set, a first power transistor 121 of a second power transistor set, a second power transistor 122 of the second power transistor set, a first power transistor 131 of a third power transistor set and a second power transistor 132 of the third power transistor set. The first configuration-variable series-type battery box 110 is electrically connected with the first power transistor 111 of the first power transistor set and the second power transistor 112 of the first power transistor set. The second configuration-variable series-type battery box 120 is electrically connected with the first power transistor 121 of the second power transistor set and the second power transistor 122 of the second power transistor set. The third configuration-variable series-type battery box 130 is electrically connected with the first power transistor 131 of the third power transistor set and the second power transistor 132 of the third power transistor set. Moreover, the first power transistor 111 of the first power transistor set, the first power transistor 121 of the second power transistor set and the first power transistor 131 of the third power transistor set are electrically connected with the first DC bus 141. The second power transistor 112 of the first power transistor set, the second power transistor 122 of the second power transistor set and the second power transistor 132 of the third power transistor set are electrically connected with the second DC bus 142. Consequently, the first configuration-variable series-type battery box 110 provides the electric energy to the first DC bus 141 and the second DC bus 142 through the first power transistor 111 of the first power transistor set and the second power transistor 112 of the first power transistor set, respectively. The second configuration-variable series-type battery box 120 provides the electric energy to the first DC bus 141 and the second DC bus 142 through the first power transistor 121 of the second power transistor set and the second power transistor 122 of the second power transistor set, respectively. The third configuration-variable series-type battery box 130 provides the electric energy to the first DC bus 141 and the second DC bus 142 through the first power transistor 131 of the third power transistor set and the second power transistor 132 of the third power transistor set, respectively.

In this embodiment, the first drive power transistor module 161 and the second drive power transistor module 162 are collaboratively defined as a first motor drive 163 in order to drive the first motor 170. The first drive power transistor module 161 is electrically connected between the first DC bus 141 and the first motor 170, and the first DC bus 141 provides electricity to the first drive power transistor module 161. The second drive power transistor module 162 is electrically connected between the second DC bus 142 and the first motor 170, and the second DC bus 142 provides electricity to the second drive power transistor module 162. The first power converter 150 is electrically connected between the first DC bus 141 and the second DC bus 142. While the power driving system 1 performs the driving voltage switching process according to the command from the vehicular computer 201, the electricity of the DC bus in the steady state power mode is used to adjust the voltage of the DC bus in the standby state to be a target driving voltage through the first power converter 150. Preferably but not exclusively, the first drive power transistor module 161 and the second drive power transistor module 162 are DC-to-AC converters.

The first motor 170 is used for driving the electric vehicle. While the power driving system 1 is in a steady state power mode according to the command from the vehicular computer 201, only one of the first drive power transistor module 161 and the second drive power transistor module 162 will transmit electric energy to the first motor 170. Under this circumstance, the plural configuration-variable series-type battery boxes 110, 120 and 130 only provide electricity to the DC bus corresponding to the drive power transistor module that provides the electric energy to the first motor 170. The other drive power transistor module that does not provide the electric energy to the first motor 170 is in the standby state to wait for the command from the vehicular computer 201.

While the power driving system 1 is in the driving voltage switching mode according to the command from the vehicular computer 201, one of the first drive power transistor module 161 and the second drive power transistor module 162 originally in the steady state power mode will decrease the output power and the output current in steps, and the other of the first drive power transistor module 161 and the second drive power transistor module 162 originally in the standby state will gradually increase the output power and the output current according to the target driving voltage requested by the vehicular computer 201 after the configuration-variable series-type battery boxes 110, 120 and 130 sequentially recombine the series connection between the battery modules to adjust the output voltage and connect to the DC bus corresponding to the drive power transistor module in the standby state. After all of the configuration-variable series-type battery boxes 110, 120 and 130 are connected to the DC bus corresponding to the drive power transistor module in the standby state, the drive power transistor module in the standby state is changed to the steady state power mode to provide electric energy. Under this circumstance, the drive power transistor module originally in the steady state power mode is switched to the standby state to stop providing electric energy.

Moreover, while the power driving system 1 performs the driving voltage switching process according to the command from the vehicular computer 201, the power driving system 1 implements a bus voltage adjusting process, a configuration-variable series-type battery box switching process and a current load distribution process. In the bus voltage adjusting process, the DC bus in the standby sate is charged or discharged by the first power converter 150, so that the voltage of the DC bus is adjusted to a target driving voltage set by the vehicular computer 201. In the configuration-variable series-type battery box switching process, the series connection configurations of the plural battery modules in the configuration-variable series-type battery boxes are changed. Consequently, the output voltages of at least two configuration-variable series-type battery boxes are alternately adjusted to the target driving voltage. After the output voltage of the configuration-variable series-type battery box is switched, the configuration-variable series-type battery box starts providing electric energy to the DC bus in the standby state. In the current load distribution process, the ratio of the output currents from the first drive power transistor module 161 and the second drive power transistor module 162 is adjusted. In other words, while the configuration-variable series-type battery box switching process is performed, the first DC bus 141 and the second DC bus 142 output electric energy to the first motor 170 through the corresponding drive power transistor modules at a predetermined ratio.

While the power driving system 1 is in the driving voltage switching mode, the first drive power transistor module 161 and the second drive power transistor module 162 adjust the output power ratio and the output current ratio. Consequently, different voltages of the corresponding DC buses synchronously output electric energy to the first motor 170.

Figure 3A:
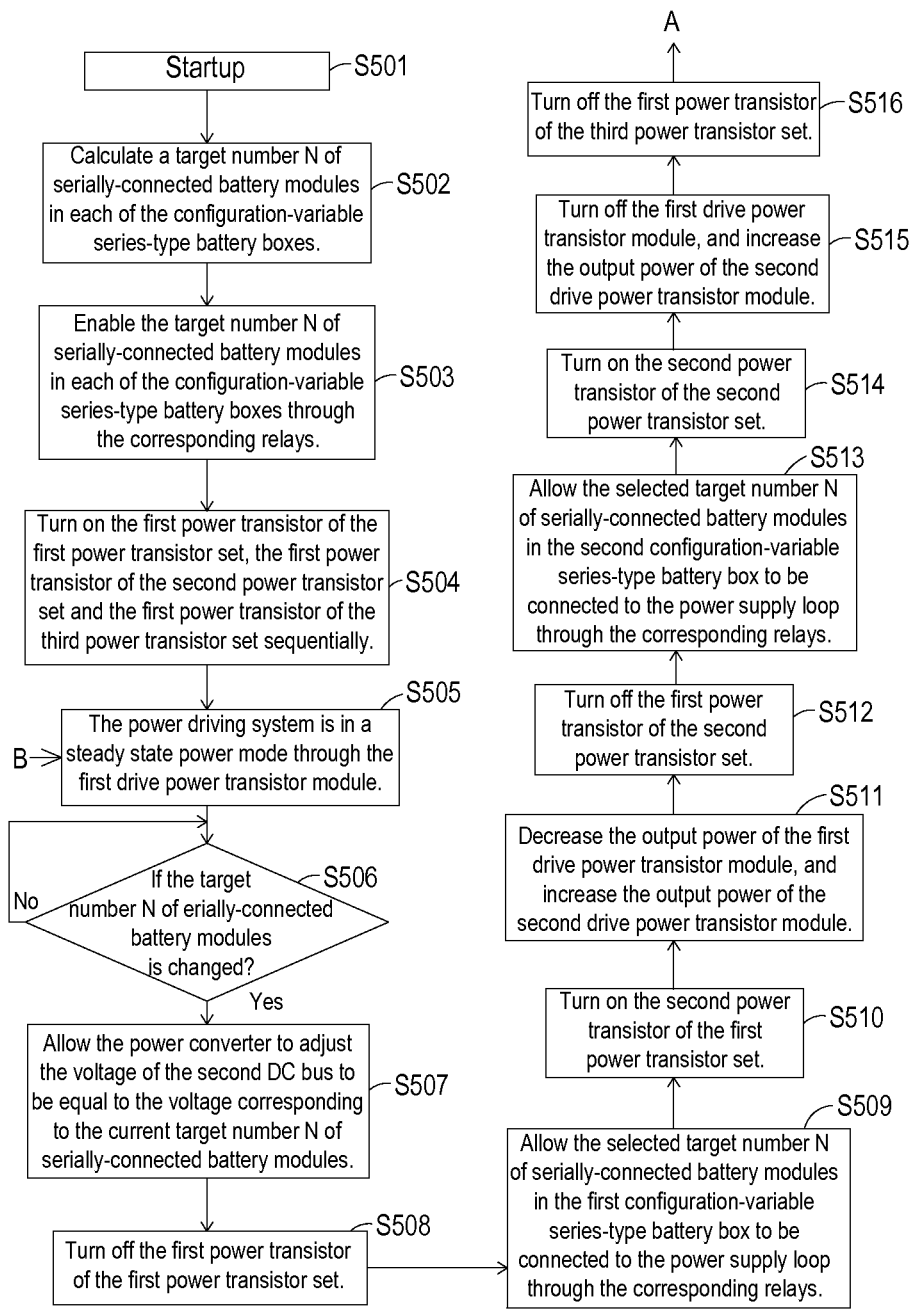
FIGS. 3A and 3B schematically illustrate a flowchart of operating the power driving system of FIG. 1.
Figure 3B:
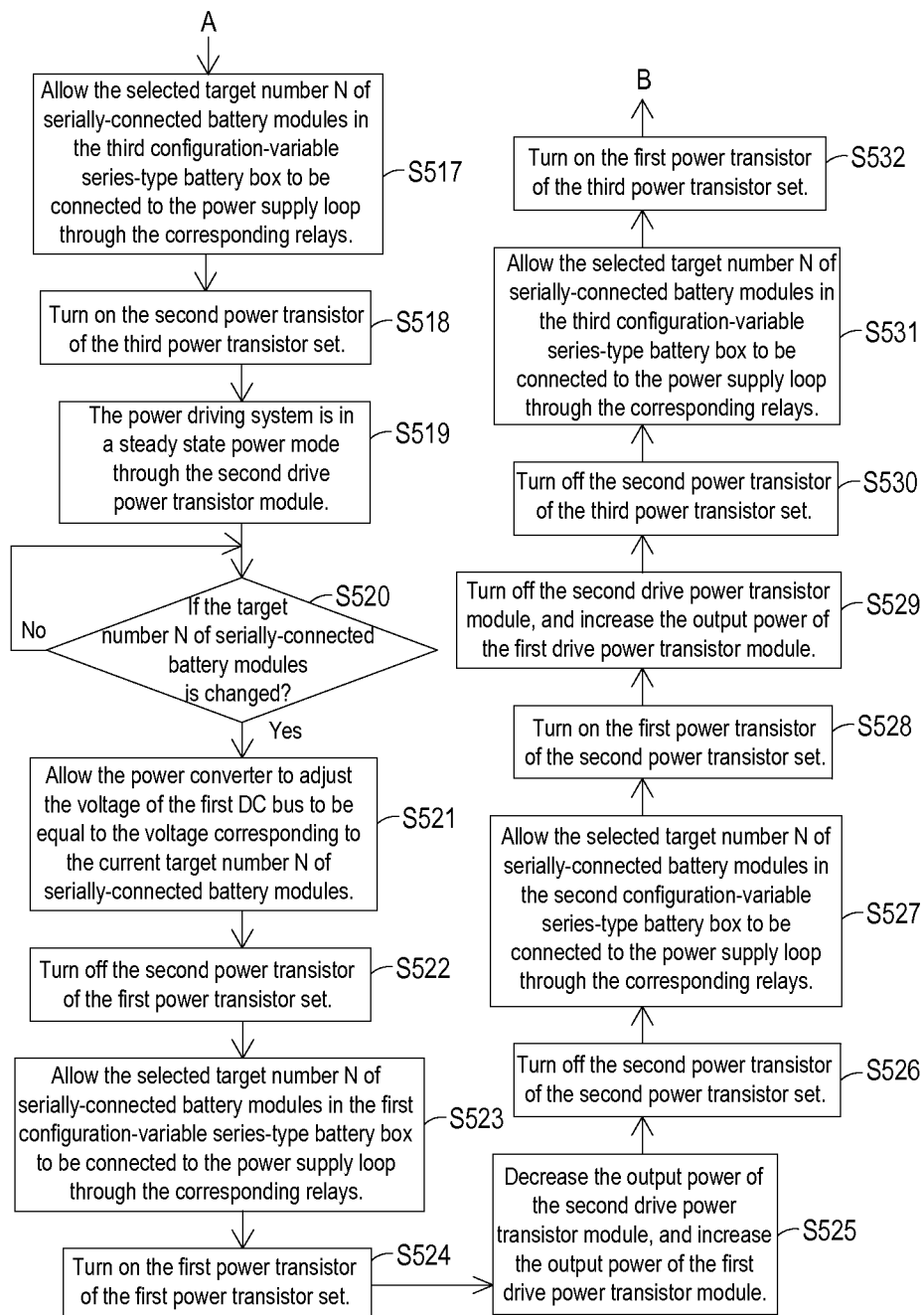
Figure 4:
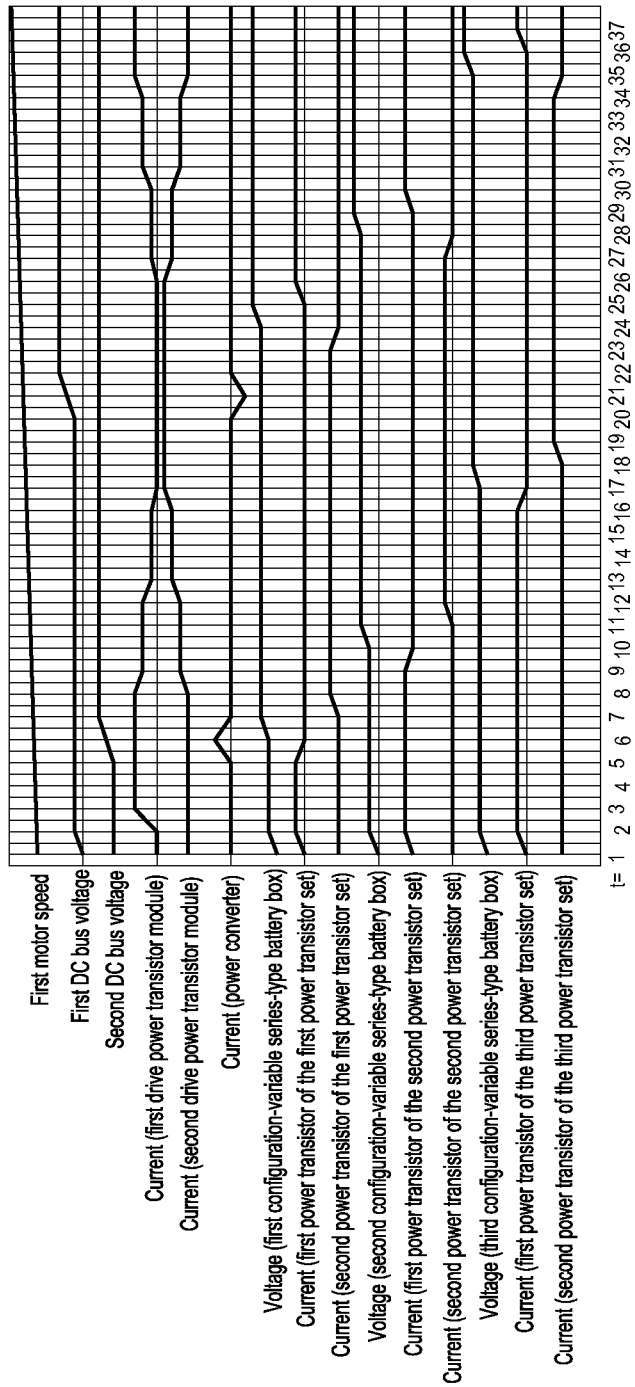
FIG. 4 is a schematic timing waveform diagram illustrating associated voltage signals or current signals processed by the power driving system of FIG. 1.

Hereinafter, the operations of the power driving system 1 of the present invention will be illustrated in more details with reference to the flowchart of FIGS. 3A and 3B. Moreover, the symbols A and B indicate the corresponding steps of the flowchart. Please refer to FIGS. 3A, 3B and 4. FIGS. 3A and 3B schematically illustrate a flowchart of operating the power driving system of FIG. 1. FIG. 4 is a schematic timing waveform diagram illustrating associated voltage signals or current signals processed by the power driving system of FIG. 1. In FIGS. 3A and 3B, the steps S501~S506 indicate a basic startup process of the power driving system 1, the steps S507~S519 indicates a first driving voltage switching process of the power driving system 1, the step S520 indicates a steady state of the power driving system 1, and the steps S521~S532 indicates a second driving voltage switching process of the power driving system 1. After the step S532, the power driving system 1 goes back to the step S506 to a steady state.

Firstly, the power driving system 1 is started up. Meanwhile, the vehicular computer 201 checks whether the first configuration-variable series-type battery box 110, the second configuration-variable series-type battery box 120, the third configuration-variable series-type battery box 130 and the internal components or circuit of the power driving system 1 are normal (Step S501).

Then, a target number N of serially-connected battery modules in each of the configuration-variable series-type battery boxes 110, 120 and 130 is calculated, wherein the target number N of serially-connected battery modules is the number of serially-connected battery modules in each of the configuration-variable series-type battery boxes 110, 120 and 130 (Step S502).

In an embodiment, the vehicular computer 201 may set that only one battery module in each of the configuration-variable series-type battery boxes 110, 120 and 130 is enabled after the startup process in the step S502. That is, the target number N of serially-connected battery modules is set as 1.

Then, according to a command from the vehicular computer 201, the target number N of serially-connected battery modules in each of the configuration-variable series-type battery boxes 110, 120 and 130 are enabled, and the relays and bypass loops of the configuration-variable series-type battery boxes 110, 120 and 130 are employed to connect the target number N of serially-connected battery modules to the power supply loops of the corresponding configuration-variable series-type battery boxes (Step S503).

Then, the first power transistor 111 of the first power transistor set, the first power transistor 121 of the second power transistor set and the first power transistor 131 of the third power transistor set are sequentially turned on. As a consequence, the corresponding configuration-variable series-type battery boxes provide electric energy to the first DC bus 141 through the first power transistor 111 of the first power transistor set, the first power transistor 121 of the second power transistor set and the first power transistor 131 of the third power transistor set (Step S504). In the step S504, the second power transistor 112 of the first power transistor set, the second power transistor 122 of the second power transistor set and the second power transistor 132 of the third power transistor set are all turned off. Consequently, the configuration-variable series-type battery boxes will not provide electric energy to the second DC bus 142, and the second drive power transistor module 162 is also turned off. Moreover, the operation of the step S504 is also referred to the time point t1 to the time point t3 of FIG. 4.

Then, according to the command from the vehicular computer 201, the power driving system 1 is in a steady state power mode. Under this circumstance, all of the configuration-variable series-type battery boxes continuously provide stabilized electric energy to the first DC bus 141 and the first drive power transistor module 161 so as to drive the first motor 170 (Step S505). Moreover, the operation of the step S505 is also referred to the time point t3 to the time point t4 of FIG. 4.

Next, the vehicular computer 201 judges whether the target number N of serially-connected battery modules needs to be increased or decreased according to the driving condition of the electric vehicle (Step S506). For example, if the speed of the electric vehicle is increased and more electric energy is required, the target number N of serially-connected battery modules is increased. Whereas, if the speed of the electric vehicle is decreased and less electric energy is required, the target number N of serially-connected battery modules is decreased. In some embodiments, the vehicular computer 201 in the step S506 may determine whether the target number N of serially-connected battery modules is increased or decreased according to the rotating speed of the first motor 170. For example, as shown in FIG. 4, if the rotating speed of the first motor 170 is increased and an increment of the driving voltage is required, or if the rotating speed of the first motor 170 is decreased and one decrement of the driving voltage is required, the target number N of serially-connected battery modules is changed to the required number according to the command from the vehicular computer 201.

If the vehicular computer 201 judges that the target number N of serially-connected battery modules does not need to be increased or decreased according to the driving condition of the electric vehicle, the power driving system 1 performs the step S506 again. On the other hand, if the vehicular computer 201 judges that the target number N of serially-connected battery modules needs to be increased or decreased according to the driving condition of the electric vehicle, a step S507 is performed. That is, according to the command from the vehicular computer 201, the first power converter 150 adjusts the voltage of the second DC bus 142 to be equal to the voltage corresponding to the current target number N of serially-connected battery modules. In addition, the second DC bus 142 is ready to connect with the power supply loops of the plural configuration-variable series-type battery boxes 110, 120 and 130. Since the first power converter 150 adjusts the voltage of the second DC bus 142 to be equal to the voltage corresponding to the current target number N of serially-connected battery modules (i.e., in the step S507), the power supply loops of the configuration-variable series-type battery boxes will not generate the surge current when the corresponding second drive power transistor module starts providing the electric energy. Moreover, the operation of the step S507 is also referred to the time point t5 to the time point t7 of FIG. 4. In the step S507, the voltage of the second DC bus 142 is increased to be one increment higher than the voltage of the first DC bus 141 according to the command from the vehicular computer 201.

After the step S507, the first power transistor 111 of the first power transistor set is turned off according to the command from the vehicular computer 201. Consequently, the power supply loop of the first configuration-variable series-type battery box 110 stops providing electric energy to the first DC bus 141. Meanwhile, the second configuration-variable series-type battery box 120 and the third configuration-variable series-type battery box 130 continuously provide electric energy to the first DC bus 141 through the first power transistor 121 of the second power transistor set and the first power transistor 131 of the third power transistor set (Step S508). Moreover, the operation of the step S508 is also referred to the time point t5 to the time point t6 of FIG. 4. After the time point t6, the first power transistor 111 of the first power transistor set is turned off.

Next, the target number N of serially-connected battery modules are selected by the vehicular computer 201 and connected to the power supply loop of the first configuration-variable series-type battery box 110, and the battery box monitoring board of the first configuration-variable series-type battery box 110 controls the relays of the corresponding relay modules. Consequently, the unselected battery modules of the first configuration-variable series-type battery box 110 other than the target number N of serially-connected battery modules are switched to a hibernation mode (Step S509). Moreover, the operation of the step S509 is also referred to the time point t6 to the time point t7 of FIG. 4. At the time point t7, the series connection between the battery modules of the first configuration-variable series-type battery box 110 is recombined and the voltage of the power supply loop is adjusted.

Then, the second power transistor 112 of the first power transistor set is turned on according to the command from the vehicular computer 201. Consequently, the power supply loop of the first configuration-variable series-type battery box 110 starts to provide electric energy to the second DC bus 142 through the second power transistor 112 of the first power transistor set (Step S510). Moreover, the operation of the step S510 is also referred to the time point t7 to the time point t8 of FIG. 4.

Next, according to the command from the vehicular computer 201, the output current and the output power of the first drive power transistor module 161 are gradually decreased, and the output current and the output power of the second drive power transistor module 162 are gradually increased (Step S511). Under this circumstance, the first drive power transistor module 161 and the second drive power transistor module 162 synchronously generate the output current and the output power at different levels. Moreover, the operation of the step S511 is also referred to the time point t8 to the time point t9 of FIG. 4. After the time point t8, the power supply loop of the first configuration-variable series-type battery box 110 starts to provide the output power to the first motor 170 through the second DC bus 142 and the second drive power transistor module 162.

Then, the first power transistor 121 of the second power transistor set is turned off according to the command from the vehicular computer 201. Consequently, the power supply loop of the second configuration-variable series-type battery box 120 stops providing electric energy to the first DC bus 141. Meanwhile, the third configuration-variable series-type battery box 130 continuously provides electric energy to the first DC bus 141 through the first power transistor 131 of the third power transistor set, and the first configuration-variable series-type battery box 110 continuously provides electric energy to the second DC bus 142 through the second power transistor 112 of the first power transistor set (Step S512). Moreover, the operation of the step S512 is also referred to the time point t9 to the time point t10 of FIG. 4.

Next, the target number N of serially-connected battery modules are selected by the vehicular computer 201 and connected to the power supply loop of the second configuration-variable series-type battery box 120, and the battery box monitoring board of the second configuration-variable series-type battery box 120 controls the relays of the corresponding relay modules. Consequently, the unselected battery modules of the second configuration-variable series-type battery box 120 other than the target number N of serially-connected battery modules are switched to a hibernation mode (Step S513). Moreover, the operation of the step S513 is also referred to the time point t10 to the time point t11 of FIG. 4. At the time point t11, the series connection between the battery modules of the second configuration-variable series-type battery box 120 is recombined and the voltage of the power supply loop is adjusted.

Then, the second power transistor 122 of the second power transistor set is turned on according to the command from the vehicular computer 201. Consequently, the power supply loop of the second configuration-variable series-type battery box 120 starts to provide electric energy to the second DC bus 142 through the second power transistor 122 of the second power transistor set (Step S514). Moreover, the operation of the step S514 is also referred to the time point t11 to the time point t12 of FIG. 4. After the time point t11, the power supply loops of the first configuration-variable series-type battery box 110 and the second configuration-variable series-type battery box 120 provide the output power to the first motor 170 through the second DC bus 142 and the second drive power transistor module 162.

Next, according to the command from the vehicular computer 201, the duty cycle of the first drive power transistor module 161 is gradually decreased to zero and the output current and the output power of the first drive power transistor module 161 are gradually decreased to zero until the first drive power transistor module 161 stops providing electric energy to the first motor 170, and the output current and the output power of the second drive power transistor module 162 are gradually increased according to the target driving voltage set by the vehicular computer (Step S515). Moreover, the operation of the step S515 is also referred to the time point t12 to the time point t17 of FIG. 4. After the time point t17, the first drive power transistor module 161 stops providing electric energy to the first motor 170.

Then, the first power transistor 131 of the third power transistor set is turned off according to the command from the vehicular computer 201. Consequently, the power supply loop of the third configuration-variable series-type battery box 130 stops providing electric energy to the first DC bus 141. Meanwhile, the first configuration-variable series-type battery box 110 and the second configuration-variable series-type battery box 120 continuously provide electric energy to the second DC bus 142 through the second power transistor 112 of the first power transistor set and the second power transistor 122 of the second power transistor set (Step S516). Moreover, the operation of the step S516 is also referred to the time point t16 to the time point t17 of FIG. 4.

Next, the target number N of serially-connected battery modules are selected by the vehicular computer 201 and connected to the power supply loop of the third configuration-variable series-type battery box 130, and the battery box monitoring board of the third configuration-variable series-type battery box 130 controls the relays of the corresponding relay modules. Consequently, the unselected battery modules of the third configuration-variable series-type battery box 130 other than the target number N of serially-connected battery modules are switched to a hibernation mode (Step S517). Moreover, the operation of the step S517 is also referred to the time point t17 to the time point t18 of FIG. 4. At the time point t18, the series connection between the battery modules of the third configuration-variable series-type battery box 130 is recombined and the voltage of the power supply loop is adjusted.

Then, the second power transistor 132 of the third power transistor set is turned on according to the command from the vehicular computer 201. Consequently, the power supply loop of the third configuration-variable series-type battery box 130 starts to provide electric energy to the second DC bus 142 through the second power transistor 132 of the third power transistor set (Step S518). Moreover, the operation of the step S518 is also referred to the time point t18 to the time point t19 of FIG. 4. After the time point t19, the power supply loops of the first configuration-variable series-type battery box 110, the second configuration-variable series-type battery box 120 and the third configuration-variable series-type battery box 130 provide the output power to the first motor 170 through the second DC bus 142 and the second drive power transistor module 162.

Then, according to the command from the vehicular computer 201, the power driving system 1 is in a steady state power mode. Under this circumstance, all of the configuration-variable series-type battery boxes continuously provide stabilized electric energy to the second DC bus 142 and the second drive power transistor module 162 so as to drive the first motor 170 (Step S519). Moreover, the operation of the step S505 is also referred to the time point t19 to the time point t20 of FIG. 4.

Next, the vehicular computer 201 judges whether the target number N of serially-connected battery modules needs to be increased or decreased according to the driving condition of the electric vehicle (Step S520). At the time point t5 and the time point t20, the vehicular computer 201 decides to increase the driving voltage at one increment.

If the vehicular computer 201 judges that the target number N of serially-connected battery modules does not need to be increased or decreased according to the driving condition of the electric vehicle, the power driving system 1 performs the step S520 again. On the other hand, if the vehicular computer 201 judges that the target number N of serially-connected battery modules needs to be increased or decreased according to the driving condition of the electric vehicle, a step S521 is performed. That is, according to the command from the vehicular computer 201, the first power converter 150 adjusts the voltage of the first DC bus 141 to be equal to the voltage corresponding to the current target number N of serially-connected battery modules. In addition, the first DC bus 141 is ready to connect with the power supply loops of the plural configuration-variable series-type battery boxes 110, 120 and 130. Since the first power converter 150 adjusts the voltage of the first DC bus 141 to be equal to the voltage corresponding to the current target number N of serially-connected battery modules (i.e., in the step S521), the power supply loops of the configuration-variable series-type battery boxes will not generate the surge current when the corresponding second drive power transistor module starts providing the electric energy. Moreover, the operation of the step S521 is also referred to the time point t20 to the time point t22 of FIG. 4. In the step S521, the voltage of the first DC bus 141 is increased to be one increment higher than the voltage of the second DC bus 142 according to the command from the vehicular computer 201.

After the step S521, the second power transistor 112 of the first power transistor set is turned off according to the command from the vehicular computer 201. Consequently, the power supply loop of the first configuration-variable series-type battery box 110 stops providing electric energy to the second DC bus 142. Meanwhile, the second configuration-variable series-type battery box 120 and the third configuration-variable series-type battery box 130 continuously provide electric energy to the second DC bus 142 through the second power transistor 122 of the second power transistor set and the second power transistor 132 of the third power transistor set (Step S522). Moreover, the operation of the step S522 is also referred to the time point t23 to the time point t24 of FIG. 4. After the time point t24, the second power transistor 112 of the first power transistor set is turned off.

Next, the target number N of serially-connected battery modules are selected by the vehicular computer 201 and connected to the power supply loop of the first configuration-variable series-type battery box 110, and the battery box monitoring board of the first configuration-variable series-type battery box 110 controls the relays of the corresponding relay modules. Consequently, the unselected battery modules of the first configuration-variable series-type battery box 110 other than the target number N of serially-connected battery modules are switched to a hibernation mode (Step S523). Moreover, the operation of the step S523 is also referred to the time point t24 to the time point t25 of FIG. 4. At the time point t25, the series connection between the battery modules of the first configuration-variable series-type battery box 110 is recombined and the voltage of the power supply loop is adjusted Then, the first power transistor 111 of the first power transistor set is turned on according to the command from the vehicular computer 201. Consequently, the power supply loop of the first configuration-variable series-type battery box 110 starts to provide electric energy to the first DC bus 141 through the first power transistor 111 of the first power transistor set (Step S524). Moreover, the operation of the step S524 is also referred to the time point t25 to the time point t26 of FIG. 4.

Next, according to the command from the vehicular computer 201, the output current and the output power of the second drive power transistor module 162 are gradually decreased, and the output current and the output power of the first drive power transistor module 161 are gradually increased (Step S525). Under this circumstance, the second drive power transistor module 162 and the first drive power transistor module 161 synchronously generate the output current and the output power at different levels. Moreover, the operation of the step S525 is also referred to the time point t26 to the time point t27 of FIG. 4. After the time point t27, the power supply loop of the first configuration-variable series-type battery box 110 starts to provide the output power to the first motor 170 through the first DC bus 141 and the first drive power transistor module 161.

Then, the second power transistor 122 of the second power transistor set is turned off according to the command from the vehicular computer 201. Consequently, the power supply loop of the second configuration-variable series-type battery box 120 stops providing electric energy to the second DC bus 142. Meanwhile, the third configuration-variable series-type battery box 130 continuously provides electric energy to the second DC bus 142 through the second power transistor 132 of the third power transistor set, and the first configuration-variable series-type battery box 110 continuously provides electric energy to the first DC bus 141 through the first power transistor 111 of the first power transistor set (Step S526). Moreover, the operation of the step S526 is also referred to the time point t27 to the time point t28 of FIG. 4.

Next, the target number N of serially-connected battery modules are selected by the vehicular computer 201 and connected to the power supply loop of the second configuration-variable series-type battery box 120, and the battery box monitoring board of the second configuration-variable series-type battery box 120 controls the relays of the corresponding relay modules. Consequently, the unselected battery modules of the second configuration-variable series-type battery box 120 other than the target number N of serially-connected battery modules are switched to a hibernation mode (Step S527). Moreover, the operation of the step S527 is also referred to the time point t28 to the time point t29 of FIG. 4. At the time point t29, the series connection between the battery modules of the second configuration-variable series-type battery box 120 is recombined and the voltage of the power supply loop is adjusted.

Then, the first power transistor 121 of the second power transistor set is turned on according to the command from the vehicular computer 201. Consequently, the power supply loop of the second configuration-variable series-type battery box 120 starts to provide electric energy to the first DC bus 141 through the first power transistor 121 of the second power transistor set (Step S528). Moreover, the operation of the step S528 is also referred to the time point t29 to the time point t30 of FIG. 4. After the time point t30, the power supply loops of the first configuration-variable series-type battery box 110 and the second configuration-variable series-type battery box 120 provide the output power to the first motor 170 through the first DC bus 141 and the first drive power transistor module 161.

Next, according to the command from the vehicular computer 201, the duty cycle of the second drive power transistor module 162 is gradually decreased to zero and the output current and the output power of the first drive power transistor module 161 are gradually decreased to zero until the second drive power transistor module 162 stops providing electric energy to the first motor 170, and the output current and the output power of the first drive power transistor module 161 are gradually increased according to the target driving voltage set by the vehicular computer 201 (Step S529). Moreover, the operation of the step S529 is also referred to the time point t30 to the time point t35 of FIG. 4. After the time point t35, the second drive power transistor module 162 stops providing electric energy to the first motor 170.

Then, the second power transistor 132 of the third power transistor set is turned off according to the command from the vehicular computer 201. Consequently, the power supply loop of the third configuration-variable series-type battery box 130 stops providing electric energy to the second DC bus 142. Meanwhile, the first configuration-variable series-type battery box 110 and the second configuration-variable series-type battery box 120 continuously provide electric energy to the first DC bus 141 through the first power transistor 111 of the first power transistor set and the first power transistor 121 of the second power transistor set (Step S530). Moreover, the operation of the step S530 is also referred to the time point t34 to the time point t35 of FIG. 4.

Next, the target number N of serially-connected battery modules are selected by the vehicular computer 201 and connected to the power supply loop of the third configuration-variable series-type battery box 130, and the battery box monitoring board of the third configuration-variable series-type battery box 130 controls the relays of the corresponding relay modules. Consequently, the unselected battery modules of the third configuration-variable series-type battery box 130 other than the target number N of serially-connected battery modules are switched to a hibernation mode (Step S531). Moreover, the operation of the step S531 is also referred to the time point t35 to the time point t36 of FIG. 4. At the time point t36, the series connection between the battery modules of the third configuration-variable series-type battery box 130 is recombined and the voltage of the power supply loop is adjusted.

Then, the first power transistor 131 of the third power transistor set is turned on according to the command from the vehicular computer 201. Consequently, the power supply loop of the third configuration-variable series-type battery box 130 starts to provide electric energy to the first DC bus 141 through the first power transistor 131 of the third power transistor set (Step S532). Moreover, the operation of the step S532 is also referred to the time point t36 to the time point t37 of FIG. 4. After the time point t37, the power supply loops of the first configuration-variable series-type battery box 110, the second configuration-variable series-type battery box 120 and the third configuration-variable series-type battery box 130 provide the output power to the first motor 170 through the first DC bus 141 and the first drive power transistor module 161.

After the step S532, the power driving system 1 goes back to the step S506 to a steady state again.

While the power driving system 1 is in the driving voltage switching mode, the bus voltage adjusting process comprises the step S507 and the step S521. While the power driving system 1 is in the driving voltage switching mode, the configuration-variable series-type battery box switching process comprises the step S509, the step S513, the step S517, the step S523, the step S527 and the step S531. While the power driving system 1 is in the driving voltage switching mode, the current load distribution process comprises the step S511, the step S515, the step S525 and the step S529.

From the above descriptions, the present invention provides a power driving system 1. The target number N of serially-connected battery modules is increased or decreased according to the rotating speed of the first motor 170. If the rotating speed of the first motor 170 is increased and one increment of the driving voltage is required, or if the rotating speed of the first motor 170 is decreased and one decrement of the driving voltage is required, the target number of serially-connected battery modules is adjusted to the required number of serially-connected battery modules corresponding to the motor speed. Consequently, the voltage provided by the power supply loop in each configuration-variable series-type battery box is switched more reliably, and the series connection configuration of the battery modules in each configuration-variable series-type battery box is changed. Moreover, while the power driving system 1 performs a driving voltage switching process, the voltage of the first DC bus 141 or the second DC bus 142 in a standby state is adjusted to the voltage corresponding to a target number of serially-connected battery modules by the first power converter 150. Consequently, while the driving voltage is switched, the problem generating the surge current is avoided. Since the power supply loops and the battery modules of the configuration-variable series-type battery boxes can be effectively protected, the use lives of the battery modules are largely increased. Moreover, since the target number N of serially-connected battery modules of the power driving system 1 is increased or decreased according to the driving condition of the electric vehicle, the number of serially-connected battery modules in each configuration-variable series-type battery box is adjustable. That is, while driving the electric vehicle, the stored energy of the battery modules can be balanced in a real-time and dynamic manner. Since the stored energy of the battery modules in each configuration-variable series-type battery box can be balanced, it is not necessary to install an additional balancing circuit. In other words, the cost of matching the battery modules in each configuration-variable series-type battery box is reduced. Since the matching cost of the battery modules of the large electric vehicle with the power driving system 1 of the present invention is close to the matching cost of the small electric vehicle, the large electric vehicle is very popular. Moreover, a driving voltage switching process is performed to switch the voltage of the power supply loop of each configuration-variable series-type battery box. Moreover, the first drive power transistor module 161 and the second drive power transistor module 162 can synchronously provide electric energy at different stages and optimized transistor duty cycles so as to generate the stable output power, which is similar to the stable output power for driving the gasoline vehicle in automatic shift. Consequently, even if the rotating speed of the first motor 170 is very low and the duty cycle of the power transistor is very low, the possibility of generating the torque ripple is minimized. Moreover, since the power supply voltage of the configuration-variable series-type battery box is adjusted according to the target number of serially-connected battery modules of the configuration-variable series-type battery box, it is not necessary to install an additional boost circuit to increase the DC bus voltage. Consequently, the use of the power driving system 1 can reduce the fabricating cost of the electric vehicle.

Figure 5:
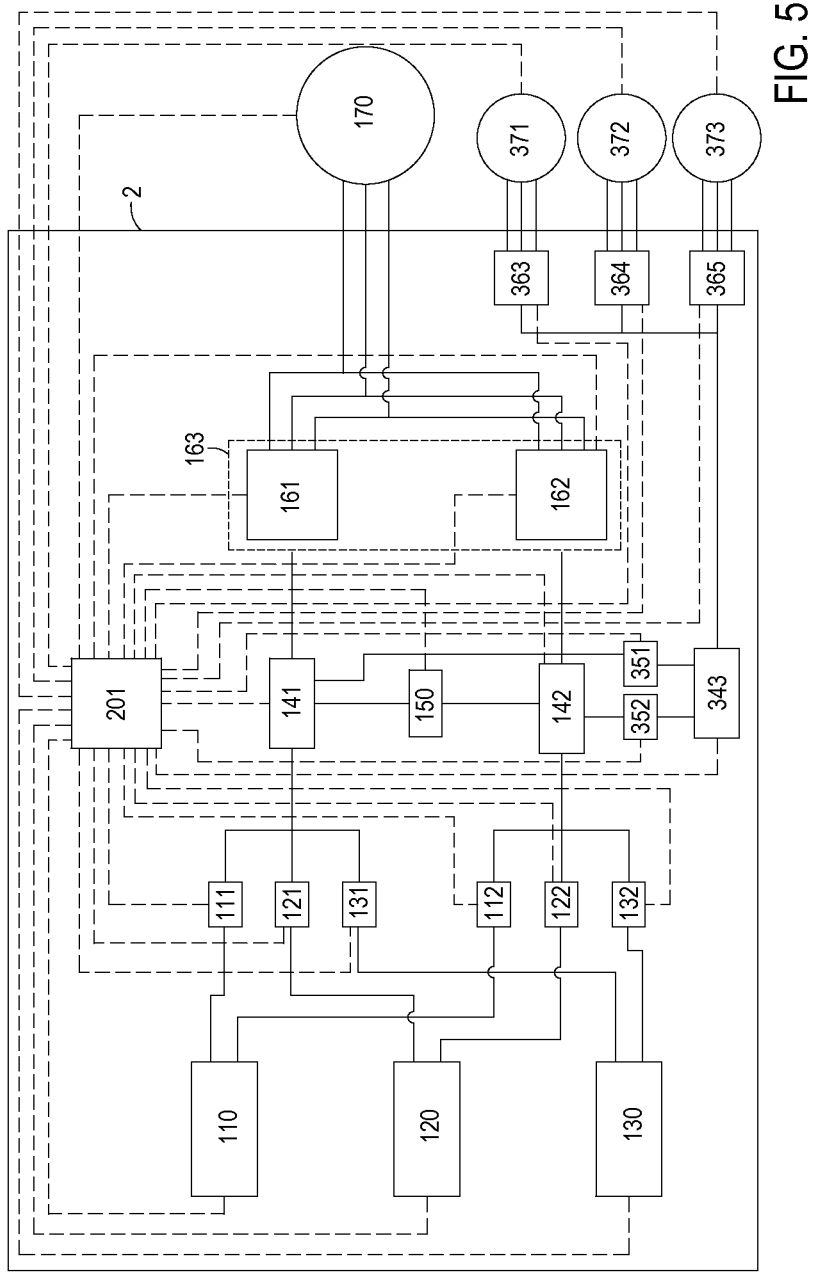
FIG. 5 schematically illustrates the architecture of a power driving system comprising plural configuration-variable series-type battery boxes according to a second embodiment of the present invention.

FIG. 5 schematically illustrates the architecture of a power driving system comprising plural configuration-variable series-type battery boxes according to a second embodiment of the present invention. The architecture of the power driving system 2 of FIG. 5 is similar to the architecture of the power driving system 1 of FIG. 1. The functions and operations of the first configuration-variable series-type battery box 110, the second configuration-variable series-type battery box 120, the third configuration-variable series-type battery box 130, the first power transistor 111 of the first power transistor set, a second power transistor 112 of the first power transistor set, the first power transistor 121 of the second power transistor set, the second power transistor 122 of the second power transistor set, the first power transistor 131 of the third power transistor set, the second power transistor 132 of the third power transistor set, the first DC bus 141, the second DC bus 142, the power converter 150, the first drive power transistor module 161, the second drive power transistor module 162 and the motor 170 of this embodiment are similar to those of FIG. 1, and are not redundantly described herein.

In this embodiment, the power driving system 2 further comprises a third DC bus 343, a second power converter 351, a third power converter 352, a second motor drive 363, a third motor drive 364 and a fourth motor drive 365. The third DC bus 343 is used for transmitting electric energy to the second motor drive 363, the third motor drive 364 and the fourth motor drive 365. The electric energy of the first DC bus 141 can be transmitted to the third DC bus 343 through the second power converter 351. The electric energy of the second DC bus 142 can be transmitted to the third DC bus 343 through the third power converter 352.

The second motor drive 363 is used for driving a second motor 371 of the electric vehicle. The second motor 371 is used for driving a diverting auxiliary system of the electric vehicle. The third motor drive 364 is used for driving a third motor 372 of the electric vehicle. The third motor 372 is used for driving an air compressor of the electric vehicle. The fourth motor drive 365 is used for driving a fourth motor 373 of the electric vehicle. The fourth motor 373 is used for driving the air-conditioning system of the electric vehicle.

In this embodiment, the first motor 170 is used for driving the electric vehicle, and the first motor 170 is the largest motor of the electric vehicle. The second motor 371, the third motor 372 and the fourth motor 373 are used for driving other auxiliary devices of the electric vehicle. Since the rotating speed of the first motor 170 varies with the speed of the electric vehicle, the uses of the voltage-variable DC buses can increase the mechanical efficiency of the first motor 170. However, since the auxiliary devices driven by the second motor 371, the third motor 372 and the fourth motor 373 are rotated at constant speed, the voltage-variable DC buses are not suitable for controlling the second motor 371, the third motor 372 and the fourth motor 373. That is, the voltage of the third DC bus 343 is constant. Since the power driving system 2 further comprises the third DC bus 343, the power driving system 2 can provide a stable DC bus voltage to the second motor drive 363, the third motor drive 364 and the fourth motor drive 365. Consequently, the controlling performance and the mechanical efficiency are enhanced.

In some embodiments, the structures of the second motor drive 363, the third motor drive 364 and the fourth motor drive 365 are similar to the structure of the first motor drive 163. That is, the operations and constituents of the second motor drive 363, the third motor drive 364 and the fourth motor drive 365 are similar to those of the first motor drive 163, which is constituted by two drive power transistor modules (i.e., the first drive power transistor module 161 and the second drive power transistor module 162).

In some embodiments, the vehicular computer 201 is in communication with the third DC bus 343, the second power converter 351, the third power converter 352, the second motor drive 363, the third motor drive 364, the fourth motor drive 365, the second motor 371, the third motor 372 and the fourth motor 373. The vehicular computer 201 is used for controlling the operations of the third DC bus 343, the second power converter 351, the third power converter 352, the second motor drive 363, the third motor drive 364, the fourth motor drive 365, the second motor 371, the third motor 372 and the fourth motor 373, and acquiring the operating information and electric energy information about the third DC bus 343, the second power converter 351, the third power converter 352, the second motor drive 363, the third motor drive 364, the fourth motor drive 365, the second motor 371, the third motor 372 and the fourth motor 373. Moreover, the vehicular computer 201 further controls the output power of the second power converter 351 and the third power converter 352 according to the output power from the second motor drive 363, the third motor drive 364 and the fourth motor drive 365. Consequently, the voltage of the third DC bus 343 is stabilized.

From the above descriptions, the present invention provides a power driving system. The target number of serially-connected battery modules is increased or decreased according to the rotating speed of a first motor. If the rotating speed of the first motor is increased and one increment of the driving voltage is required, or if the rotating speed of the first motor is decreased and one decrement of the driving voltage is required, the target number of serially-connected battery modules is adjusted to the required number of serially-connected battery modules corresponding to the motor speed. Consequently, the voltage provided by the power supply loop in each configuration-variable series-type battery box is switched more reliably, and the series connection configuration of the battery modules in each configuration-variable series-type battery box is changed. Moreover, while the power driving system performs a driving voltage switching process, the voltage of a first DC bus or a second DC bus in a standby state is adjusted to the voltage corresponding to a target number of serially-connected battery modules by the power converter. Consequently, while the driving voltage is switched, the problem generating the surge current is avoided. Since the power supply loops and the battery modules of the configuration-variable series-type battery boxes can be effectively protected, the use lives of the battery modules are largely increased. Moreover, since the target number of serially-connected battery modules of the power driving system is increased or decreased according to the driving condition of the electric vehicle, the number of serially-connected battery modules in each configuration-variable series-type battery box is adjustable. That is, while driving the electric vehicle, the stored energy of the battery modules can be balanced in a real-time and dynamic manner. Since the stored energy of the battery modules in each configuration-variable series-type battery box can be balanced, it is not necessary to install an additional balancing circuit. In other words, the cost of matching the battery modules in each configuration-variable series-type battery box is reduced. Since the matching cost of the battery modules of the large electric vehicle with the power driving system of the present invention is close to the matching cost of the small electric vehicle, the large electric vehicle is very popular. Moreover, a driving voltage switching process is performed to switch the voltage of the power supply loop of each configuration-variable series-type battery box. Moreover, a first drive power transistor module and a second drive power transistor module can synchronously provide electric energy at different stages and optimized transistor duty cycles so as to generate the stable output power, which is similar to the stable output power for driving the gasoline vehicle in automatic shift. Consequently, even if the rotating speed of the first motor is very low and the duty cycle of the power transistor is very low, the possibility of generating the torque ripple is minimized. Moreover, since the power supply voltage of the configuration-variable series-type battery box is adjusted according to the target number of serially-connected battery modules of the configuration-variable series-type battery box, it is not necessary to install an additional boost circuit to increase the DC bus voltage. Consequently, the use of the power driving system can reduce the fabricating cost of the electric vehicle.

What is claimed is:

1. A power driving system for an electric vehicle, the electric vehicle comprising a motor, the power driving system comprising:
   plural configuration-variable series-type battery boxes;
   a first DC bus electrically connected with the plural configuration-variable series-type battery boxes for selectively receiving electric energy from the plural configuration-variable series-type battery boxes;
   a second DC bus electrically connected with the plural configuration-variable series-type battery boxes for selectively receiving electric energy from the plural configuration-variable series-type battery boxes; and
   a power converter electrically connected between first DC bus and the second DC bus, wherein after the power driving system is changed from a steady state power mode to a driving voltage switching mode, a driving voltage switching process is performed, wherein if the first DC bus is in a steady state and the second DC bus is in a standby state while the driving voltage switching process is performed, the power converter uses a voltage of the first DC bus to adjust a voltage of the second DC bus, or if the second DC bus is in the steady state and the first DC bus is in the standby state while the driving voltage switching process is performed, the power converter uses the voltage of the second DC bus to adjust the voltage of the first DC bus.

2. The power driving system according to claim 1, wherein while the power driving system is in the steady state power mode, one of the first DC bus and the second DC bus is in the steady state to use electric energy of the plural configuration-variable series-type battery boxes to drive the motor, and the other of the first DC bus and the second DC bus is in the standby state.

3. The power driving system according to claim 2, wherein the driving voltage switching process comprises a bus voltage adjusting process, wherein the first DC bus or the second DC bus in the standby sate is charged/discharged by the power converter, so that the first DC bus or the second DC bus in the standby sate is adjusted to a target driving voltage.

4. The power driving system according to claim 3, wherein the driving voltage switching process comprises a configuration-variable series-type battery box switching process, wherein while the configuration-variable series-type battery box switching process is performed, a series connection configuration of the plural battery modules in each configuration-variable series-type battery box is changed, so that output voltages of the plural configuration-variable series-type battery boxes are alternately adjusted to the target driving voltage,
   wherein the power driving system further comprises a first drive power transistor module and a second drive power transistor module, the first drive power transistor module is electrically connected between the first DC bus and the motor, the second drive power transistor module is electrically connected between the second DC bus and the motor, and the motor is driven by the first drive power transistor module and the second drive power transistor module.

5. The power driving system according to claim 4, wherein the driving voltage switching process comprises a current load distribution process, wherein while the configuration-variable series-type battery box switching process is performed, the first DC bus and the second DC bus output electric energy to the motor through the first drive power transistor module and the second drive power transistor module at a predetermined ratio.

6. A power driving system, comprising:
a motor;
a first DC bus;
a first drive power transistor module electrically connected between the motor and the first DC bus so as to selectively drive the motor;
a second DC bus;
a second drive power transistor module electrically connected between the motor and the second DC bus so as to selectively drive the motor;
a power converter electrically connected between the first DC bus and the second DC bus for transmitting electric energy from the first DC bus to the second DC bus or transmitting electric energy from the second DC bus to the first DC bus;
a first configuration-variable series-type battery box comprising plural battery modules, wherein if one or more battery modules of the plural battery modules are connected to a first bypass loop, an output voltage from the first configuration-variable series-type battery box is decreased;
a first power transistor of a first power transistor set electrically connected between the first configuration-variable series-type battery box and the first DC bus;
a second power transistor of the first power transistor set electrically connected between the first configuration-variable series-type battery box and the second DC bus;
a second configuration-variable series-type battery box comprising plural battery modules, wherein if one or more battery modules of the plural battery modules are connected to a second bypass loop, an output voltage from the second configuration-variable series-type battery box is decreased;
a first power transistor of a second power transistor set electrically connected between the second configuration-variable series-type battery box and the first DC bus;
a second power transistor of the second power transistor set electrically connected between the second configuration-variable series-type battery box and the second DC bus;
a third configuration-variable series-type battery box comprising plural battery modules, wherein if one or more battery modules of the plural battery modules are connected to a third bypass loop, an output voltage from the third configuration-variable series-type battery box is decreased;
a first power transistor of a third power transistor set electrically connected between the third configuration-variable series-type battery box and the first DC bus;
a second power transistor of the third power transistor set electrically connected between the third configuration-variable series-type battery box and the second DC bus; and
a controlling unit for controlling the power converter, the first configuration-variable series-type battery box, the first power transistor of the first power transistor set, the second power transistor of the first power transistor set, the second configuration-variable series-type battery box, the first power transistor of the second power transistor set, the second power transistor of the second power transistor set, the third configuration-variable series-type battery box, the first power transistor of the third power transistor set and the second power transistor of the third power transistor set.

7. The power driving system according to claim 6, wherein while the power driving system is started up, the controlling unit turns on the first power transistor of the first power transistor set, the first power transistor of the second power transistor set and the first power transistor of the third power transistor set, and electric energy of the first configuration-variable series-type battery box, the second configuration-variable series-type battery box and the third configuration-variable series-type battery box is transmitted to the first DC bus through the first power transistor of the first power transistor set, the first power transistor of the second power transistor set and the first power transistor of the third power transistor set.

8. The power driving system according to claim 7, wherein after the power driving system is changed from a steady state power mode to a driving voltage switching mode, the controlling unit controls the power converter to increase a voltage of the second DC bus in a standby state.

9. The power driving system according to claim 8, wherein after the voltage of the second DC bus in the standby state is increased by the power converter, the controlling unit further turns off the first power transistor of the first power transistor set, changes the output voltage of the first configuration-variable series-type battery box, and turns on the second power transistor of the first power transistor set.

10. The power driving system according to claim 9, wherein after the second power transistor of the first power transistor set is turned on, the controlling unit further turns off the first power transistor of the second power transistor set, changes the output voltage of the second configuration-variable series-type battery box, and turns on the second power transistor of the second power transistor set.

11. The power driving system according to claim 10, wherein after the second power transistor of the second power transistor set is turned on, the controlling unit further turns off the first power transistor of the third power transistor set, changes the output voltage of the third configuration-variable series-type battery box, and turns on the second power transistor of the third power transistor set.

12. The power driving system according to claim 11, wherein the controlling unit controls operations of the first drive power transistor module and the second drive power transistor module, wherein while the controlling unit controls the first drive power transistor module to decrease output power, the controlling unit controls the second drive power transistor module to increase output power.

13. The power driving system according to claim 11, wherein the controlling unit sets a target driving voltage, wherein if the first DC bus is in a steady state and the second DC bus is in a standby state, a voltage of the first DC bus is used to adjust the voltage of the second DC bus to the target driving voltage.

14. A power driving system, comprising:
a first motor;
a second motor;
a first DC bus;

a first drive power transistor module electrically connected between the first motor and the first DC bus so as to selectively drive the first motor;

a second DC bus;

a second drive power transistor module electrically connected between the first motor and the second DC bus, wherein the first drive power transistor module and the second drive power transistor module are collaboratively defined as a first motor drive so as to selectively drive the first motor;

a third DC bus;

a second motor drive electrically connected between the second motor and the third DC bus for driving the second motor;

a first power converter electrically connected between the first DC bus and the second DC bus for transmitting electric energy from the first DC bus to the second DC bus or transmitting electric energy from the second DC bus to the first DC bus;

a second power converter electrically connected between the first DC bus and the third DC bus for transmitting electric energy from the first DC bus to the third DC bus;

a third power converter electrically connected between the second DC bus and the third DC bus for transmitting electric energy from the second DC bus to the third DC bus;

a first configuration-variable series-type battery box comprising plural battery modules, wherein if one or more battery modules of the plural battery modules are connected to a first bypass loop, an output voltage from the first configuration-variable series-type battery box is decreased;

a first power transistor of a first power transistor set electrically connected between the first configuration-variable series-type battery box and the first DC bus;

a second power transistor of the first power transistor set electrically connected between the first configuration-variable series-type battery box and the second DC bus;

a second configuration-variable series-type battery box comprising plural battery modules, wherein if one or more battery modules of the plural battery modules are connected to a second bypass loop, an output voltage from the second configuration-variable series-type battery box is decreased;

a first power transistor of a second power transistor set electrically connected between the second configuration-variable series-type battery box and the first DC bus;

a second power transistor of the second power transistor set electrically connected between the second configuration-variable series-type battery box and the second DC bus;

a third configuration-variable series-type battery box comprising plural battery modules, wherein if one or more battery modules of the plural battery modules are connected to a third bypass loop, an output voltage from the third configuration-variable series-type battery box is decreased;

a first power transistor of a third power transistor set electrically connected between the third configuration-variable series-type battery box and the first DC bus;

a second power transistor of the third power transistor set electrically connected between the third configuration-variable series-type battery box and the second DC bus; and a controlling unit for controlling the first power converter, the second power converter, the third power converter, the first configuration-variable series-type battery box, the first power transistor of the first power transistor set, the second power transistor of the first power transistor set, the second configuration-variable series-type battery box, the first power transistor of the second power transistor set, the second power transistor of the second power transistor set, the third configuration-variable series-type battery box, the first power transistor of the third power transistor set and the second power transistor of the third power transistor set.

15. The power driving system according to claim 14, wherein while the controlling unit controls the first drive power transistor module to reduce output power, the controlling unit controls the second drive power transistor module to increase output power, wherein the controlling unit controls output power from the second power converter and the third power converter according to output power of the second motor drive, so that a voltage of the third DC bus is stabilized.

* * * * *